(12) United States Patent
Tran et al.

(10) Patent No.: US 12,507,038 B2
(45) Date of Patent: Dec. 23, 2025

(54) DYNAMIC ESTIMATION OF REAL-TIME DISTRIBUTION DENSITY OF WIRELESS DEVICES USING MACHINE LEARNING MODELS

(71) Applicant: T-Mobile USA, Inc., Bellevue, WA (US)

(72) Inventors: Antoine T. Tran, Issaquah, WA (US); Alexander Anh Tran, San Diego, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 370 days.

(21) Appl. No.: 17/851,805

(22) Filed: Jun. 28, 2022

(65) Prior Publication Data

US 2023/0421994 A1    Dec. 28, 2023

(51) Int. Cl.
*H04W 4/029* (2018.01)
*G06N 20/00* (2019.01)
*H04W 4/021* (2018.01)
*H04W 24/08* (2009.01)
*H04W 24/10* (2009.01)

(52) U.S. Cl.
CPC ............ *H04W 4/029* (2018.02); *G06N 20/00* (2019.01); *H04W 4/021* (2013.01); *H04W 24/08* (2013.01); *H04W 24/10* (2013.01)

(58) Field of Classification Search
CPC ........ G06N 20/00; G06N 20/10; G06N 20/20; G06N 3/08; G06N 5/01; G06N 7/01; H04W 24/08; H04W 24/10; H04W 4/021; H04W 4/029
See application file for complete search history.

(56) References Cited

U.S. PATENT DOCUMENTS

| 5,732,383 A | 3/1998 | Foladare et al. |
| 6,018,699 A | 1/2000 | Baron et al. |
| 6,275,774 B1 | 8/2001 | Baron et al. |

(Continued)

FOREIGN PATENT DOCUMENTS

| CN | 105052229 A | 11/2015 |
| CN | 103379169 B | 7/2017 |

(Continued)

*Primary Examiner* — Nguyen T Vo

(74) *Attorney, Agent, or Firm* — Perkins Coie LLP

(57) ABSTRACT

A computer-implemented method generates an estimate of a real-time distribution density of wireless devices in a geographic area. The method includes receiving real-time network activity data collected at cell sites. The method includes processing the real-time network activity data with an ML model. The ML model is trained based on non-real-time network activity data indicating network activities as well as location data of wireless devices served by the cell sites. The ML model is configured to predict a real-time distribution of wireless devices in the geographic area at different points in time. The method includes predicting a real-time distribution of the wireless devices based on a pattern of network activities and locations of wireless devices. The method also includes generating an estimate of a distribution density of the wireless devices in the geographic area based on the predicted real-time distribution and adjusted by the real-time count of network activities.

21 Claims, 5 Drawing Sheets

(56) References Cited

U.S. PATENT DOCUMENTS

| | | |
|---|---|---|
| 6,577,946 B2 | 6/2003 | My |
| 6,792,321 B2 | 9/2004 | Sepe |
| 6,983,139 B2 | 1/2006 | Dowling et al. |
| 7,123,918 B1 | 10/2006 | Goodman |
| 7,233,933 B2 | 6/2007 | Horvitz et al. |
| 7,739,210 B2 | 6/2010 | Horvitz et al. |
| 7,742,769 B2 | 6/2010 | Goodman |
| 7,774,440 B1 | 8/2010 | Bagrodia et al. |
| 8,224,348 B2 | 7/2012 | Bolon et al. |
| 8,290,496 B2 | 10/2012 | Segall et al. |
| 8,922,430 B2 | 12/2014 | Gander et al. |
| 9,014,888 B2 | 4/2015 | Sukkarié et al. |
| 9,288,689 B2 | 3/2016 | Lee et al. |
| 9,297,723 B1 | 3/2016 | Hofmann et al. |
| 9,432,865 B1 | 8/2016 | Jadunandan et al. |
| 9,572,165 B2 | 2/2017 | Keerthi |
| 9,602,345 B2 | 3/2017 | Saha et al. |
| 9,615,202 B2 | 4/2017 | Dal Santo et al. |
| 9,639,103 B2 | 5/2017 | Darden et al. |
| 9,667,641 B2 | 5/2017 | Muddu et al. |
| 9,699,680 B2 | 7/2017 | Wisherd |
| 9,754,266 B2 | 9/2017 | Zhang |
| 9,823,626 B2 | 11/2017 | Zornio et al. |
| 9,875,492 B2 | 1/2018 | Dupray |
| 10,063,406 B2 | 8/2018 | Tapia et al. |
| 10,311,356 B2 | 6/2019 | Gu et al. |
| 10,397,043 B2 | 8/2019 | Tapia et al. |
| 10,440,503 B2 | 10/2019 | Tapia |
| 10,473,478 B1 | 11/2019 | Seshadri |
| 10,484,891 B2 | 11/2019 | Polepalli |
| 10,644,979 B2 | 5/2020 | Samadi |
| 10,699,218 B2 | 6/2020 | Anderson et al. |
| 10,708,795 B2 | 7/2020 | Tapia |
| 10,956,758 B2 | 3/2021 | Welland et al. |
| 11,074,522 B2 | 7/2021 | Anderson et al. |
| 11,146,990 B1* | 10/2021 | Marupaduga .......... H04W 28/08 |
| 11,332,173 B2 | 5/2022 | Howard et al. |
| 11,337,096 B2 | 5/2022 | Saluja et al. |
| 2003/0224806 A1 | 12/2003 | Hebron |
| 2006/0143026 A1 | 6/2006 | Jagannathan et al. |
| 2006/0166664 A1 | 7/2006 | Livet et al. |
| 2008/0076450 A1* | 3/2008 | Nanda .................. H04W 24/10 455/422.1 |
| 2009/0048890 A1 | 2/2009 | Burgh |
| 2010/0122334 A1 | 5/2010 | Stanzione et al. |
| 2011/0040603 A1 | 2/2011 | Wolfe |
| 2012/0221379 A1 | 8/2012 | Martinez et al. |
| 2013/0253968 A1 | 9/2013 | Martinez et al. |
| 2014/0244742 A1* | 8/2014 | Yu ........................ G06Q 30/02 709/204 |
| 2014/0293955 A1 | 10/2014 | Keerthi |
| 2017/0357866 A1 | 12/2017 | Welland et al. |
| 2020/0311852 A1* | 10/2020 | Torshizi ................ H04L 67/10 |
| 2021/0041259 A1 | 2/2021 | Filip et al. |
| 2021/0107539 A1 | 4/2021 | Howard et al. |
| 2021/0182571 A1* | 6/2021 | Genes .................... G06N 3/045 |
| 2021/0256407 A1 | 8/2021 | Therani et al. |
| 2021/0337354 A1 | 10/2021 | Faustino et al. |
| 2021/0399794 A1 | 12/2021 | Arora et al. |
| 2022/0086122 A1 | 3/2022 | Therani et al. |
| 2022/0110021 A1 | 4/2022 | Livne et al. |
| 2022/0138260 A1* | 5/2022 | Koval ................ G01C 21/3841 707/798 |
| 2022/0155773 A1 | 5/2022 | Kulshreshtha |
| 2022/0254161 A1* | 8/2022 | Tatrai .................... G06V 10/82 |

FOREIGN PATENT DOCUMENTS

| | | |
|---|---|---|
| CN | 106851674 B | 10/2019 |
| CN | 106998556 B | 12/2019 |
| CN | 111837013 A | 10/2020 |
| CN | 109468918 B | 6/2021 |
| EP | 0763807 B1 | 12/2000 |
| EP | 1194862 A1 | 4/2002 |
| EP | 1535483 A1 | 6/2005 |
| EP | 2898342 A2 | 7/2015 |
| EP | 3039551 A1 | 7/2016 |
| EP | 2947910 B1 | 6/2017 |
| EP | 3274889 A1 | 1/2018 |
| EP | 3282418 A1 | 2/2018 |
| EP | 3340115 A1 | 6/2018 |
| EP | 3350753 A1 | 7/2018 |
| EP | 3746744 A1 | 12/2020 |
| EP | 3465459 B1 | 2/2021 |
| EP | 3845023 A1 | 7/2021 |
| EP | 3464895 B1 | 10/2021 |
| KR | 102338519 B1 | 12/2021 |
| WO | 0070481 A1 | 11/2000 |
| WO | 2010119182 A1 | 10/2010 |
| WO | 2014158205 A1 | 10/2014 |
| WO | 2016097998 A1 | 6/2016 |
| WO | 2016149794 A1 | 9/2016 |
| WO | 2016155372 A1 | 10/2016 |
| WO | 2017214271 A1 | 12/2017 |
| WO | 2017218585 A1 | 12/2017 |
| WO | 2017218595 A1 | 12/2017 |
| WO | 2018002910 A1 | 1/2018 |
| WO | 2018036149 A1 | 3/2018 |
| WO | 2018094502 A1 | 5/2018 |
| WO | 2018148732 A2 | 8/2018 |
| WO | 2019034805 A1 | 2/2019 |
| WO | 2019130003 A1 | 7/2019 |
| WO | 2019162858 A1 | 8/2019 |
| WO | 2019172941 A1 | 9/2019 |
| WO | 2020188585 A1 | 9/2020 |
| WO | 2020238224 A1 | 12/2020 |
| WO | 2020255040 A1 | 12/2020 |
| WO | 2021209801 A1 | 10/2021 |

\* cited by examiner

DYNAMIC ESTIMATION OF REAL-TIME DISTRIBUTION DENSITY OF WIRELESS DEVICES USING MACHINE LEARNING MODELS

BACKGROUND

Population distribution refers to a measurement describing how a population is spread across a specific geographic area. Population distribution can be estimated with many statistical methodologies (e.g., by data collected by the Census Bureau). However, such data does not reflect real-time population distribution taking into account people's mobility. Population distribution changes significantly throughout the day as people change their locations between, for example, their homes, workplaces, recreational places, and commercial places.

Estimation of a real-time (or near-real-time) population distribution could be useful for, for example, solving navigation or routing issues with ground and vehicle traffic dynamically or in instances of manmade or natural disasters. Accurate and precise estimation of real-time population distribution at different times of the day on different days of the week is challenging because the prediction of human mobility depends on a vast variety of factors. For example, people may gather on a beach on hot and sunny summer days while staying indoors on rainy and cold summer days. As most individuals use mobile devices (e.g., mobile phones), a real-time distribution of mobile devices in a geographic area can be used to infer population distribution in that geographic area.

BRIEF DESCRIPTION OF THE DRAWINGS

Detailed descriptions of implementations of the present invention will be described and explained through the use of the accompanying drawings.

Figure 1:
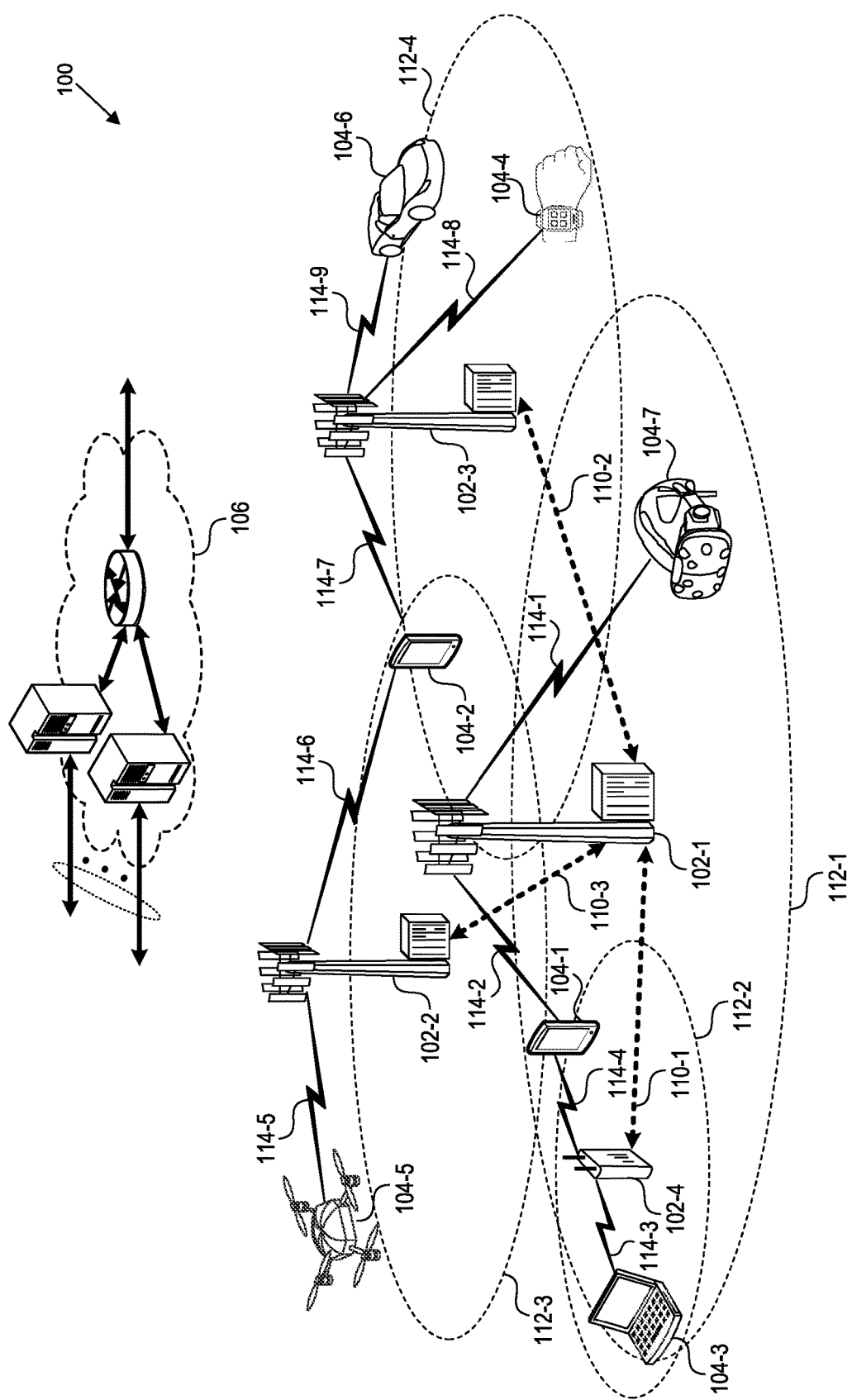
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to machine learning (ML) based processes for estimating a real-time distribution density of wireless devices in a geographic area. As used herein, the term "real-time" can encompass a delay that is generally imperceptible to humans such as near real-time. The real-time distribution density of the wireless devices can be used to estimate population distribution density in the geographic area based on the fact that a majority of the population uses wireless devices. A real-time distribution density information is desired but the only real-time network activity data (e.g., network traffic) that is available does not indicate the locations of the wireless devices from where the real-time data was generated. Existing technologies, therefore, can be used to provide a magnitude of network activity data within a particular area but now how its distributed over the area. Non-real-time data that associates time-stamped network activity data and locations are only available infrequently and with a delay. An example of such data includes diagnostic metrics data which can be collected every 12 hours or every 24 hours. Moreover, the diagnostic metrics data is collected only from users of wireless devices that have opted into providing such diagnostic metrics data, which is generally less than all the wireless devices in the area.

The present technology solves the above shortcoming to provide real-time population distribution by (i) training a machine learning model based on the diagnostic metrics data to create a distribution of network activities for different time intervals of the day on different days of the week and (ii) uses the trained ML model to estimate a population based on the network activity data that is collected in real-time (without location data) into to the ML model. The model aligns time intervals between the real-time network activity data and the training data to predict the magnitude and distribution of wireless devices in real-time. The estimate can be further adjusted to account for the fact that the training data only counts for the portion of the wireless devices that have opted in to allow the collection of the diagnostic metrics.

In one example, a computer-implemented method dynamically generates an estimate of a real-time distribution density of wireless devices in a geographic area. The method can include receiving real-time network activity data collected at multiple cell sites in a geographic area. The real-time network activity data can indicate a real-time count of network activities by multiple wireless devices currently being served by the multiple cell sites in the geographic region. The real-time count of network activities can include a count of voice, data, or messaging activities. The method can include processing the real-time network activity data with an ML model. The ML model can be trained based on non-real-time network activity data to predict distributions of wireless devices in the geographic area. The non-real-time network activity data can indicate counts of voice, data, or messaging activities by a portion of wireless devices previously served at different points in time by the multiple cell sites in the geographic region. The non-real-time data also includes location data of the portion of wireless devices. The ML model can be configured to predict a real-time distribution of wireless devices in the geographic area at different points in time. The method can include predicting a real-time distribution of the multiple wireless devices in the geographic area based on the ML model. The real-time distribution can be predicted based on a pattern of network activities and locations of wireless devices at prior points in time that are analogous to a current point in time. The method can also include dynamically generating an estimate of a distribution density of the multiple wireless devices in the geographic area based on the predicted real-time distribution, adjusted by the real-time count of network activities.

In another example, a computer system dynamically generates an estimate of a real-time distribution density of wireless devices in a geographic area. The system can receive real-time network activity data collected at multiple cell sites in a geographic area. The system can process the real-time network activity data with an ML model that is trained based on non-real-time network activity data to predict distributions of wireless devices in the geographic area. The non-real-time network activity data can indicate counts of network activities by wireless devices previously served at different time intervals by the multiple cell sites in the geographic area. The non-real-time network activity can also include the location data of the wireless devices. The ML model can be configured to predict a real-time distribution of wireless devices in the geographic area at different time intervals. The system can predict, based on the ML model, a real-time distribution of the multiple wireless devices in the geographic area. The real-time distribution is predicted based on a pattern of network activities and locations of wireless devices at prior time intervals that are analogous to a current time interval. The system can dynamically generate an estimate of the distribution density of the multiple wireless devices in the geographic area based on the predicted real-time distribution that is adjusted by the real-time count of network activities.

In yet another example, a computer-implemented method trains an ML classifier for the estimation of a real-time distribution density of wireless devices in a geographic area. The method can include designating a geographic area into multiple subregions. The geographic area can be included in a network coverage area of multiple cell sites. The method can include collecting a training data set. The training data set includes non-real-time network activity data indicating counts of voice, data, or messaging activities by wireless devices previously served at different points in time by the multiple cell sites in the geographic area. The non-real-time network activity data can also include the location data of the wireless devices. The method can include training an untrained or partially untrained ML classifier with the training data set to associate the non-real-time network activity of the wireless devices at the different points in time with respective subregions of the geographic area. The association can be done based on the location data of the wireless devices. The method thereby includes obtaining a trained ML classifier that can estimate a real-time distribution of the multiple wireless devices across the subregions of the geographic area.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WVAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Estimation of a Real-Time Distribution Density of Wireless Devices

Figure 2:
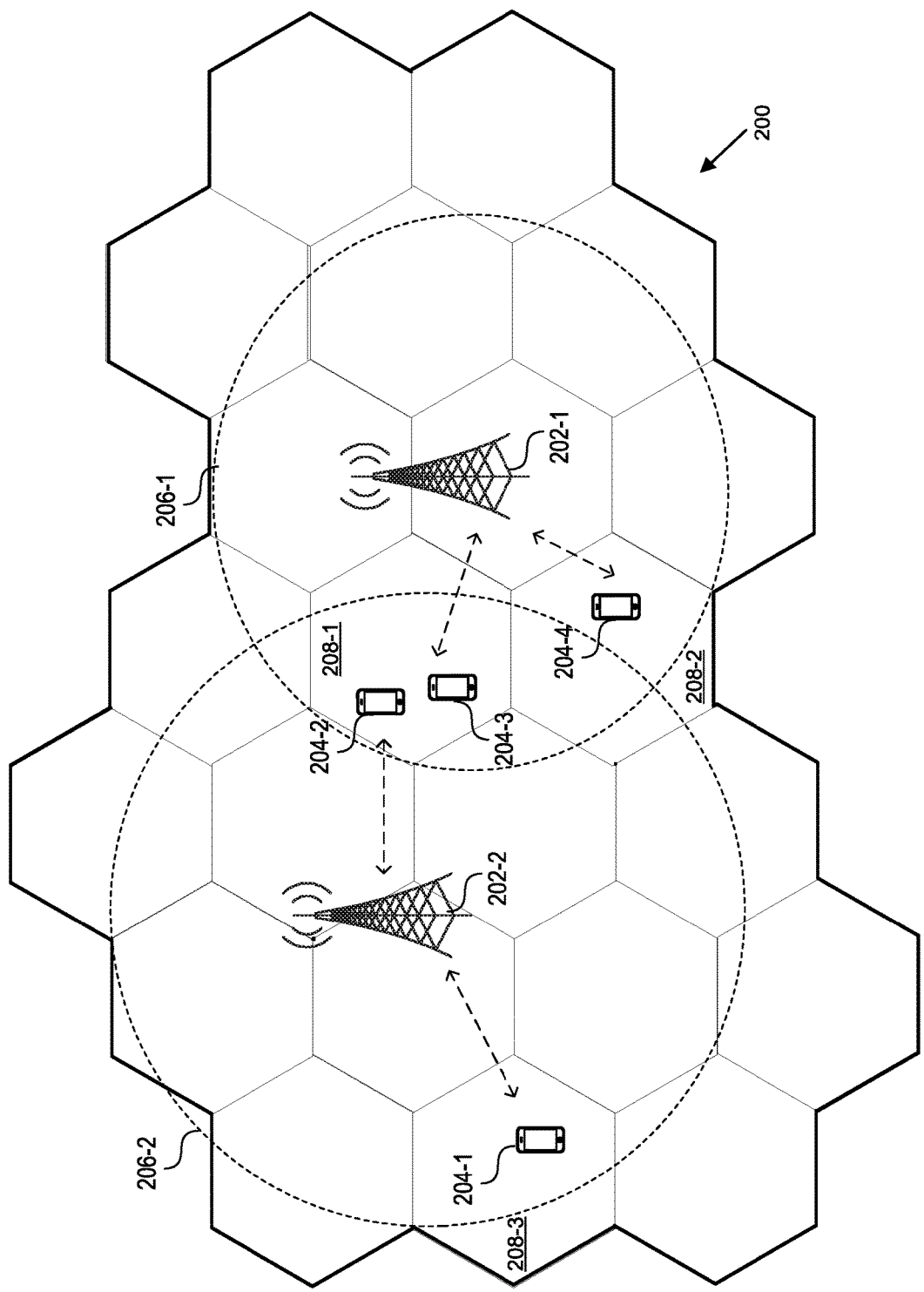
FIG. 2 illustrates an exemplary geographic area for estimation of the distribution density of wireless devices.

FIG. 2 illustrates an exemplary geographic area 200 used to estimate the distribution density. The geographic area 200 represents any geographical area of interest that is considered to estimate a population distribution density. As used herein, a "distribution density" can refer to a distribution of a number of people (or a number of wireless devices) per a unit area across a particular geographical area. The distribution density thereby provides information on the number of people as well as relative locations of the people within the geographic area. As a majority of people use wireless devices (e.g., a mobile phone), the population distribution density can be inferred based on the distribution density of wireless devices.

The geographic area 200 can include one or more areas of high population density (e.g., cities and towns), one or more areas of low population density (e.g., rural areas), or a combination thereof. The geographic area 200 is serviced by a wireless service provider via one or more cell sites (e.g., cell sites 202-1 and 202-2 also referred to herein collectively as "cell sites 202") so that wireless devices (e.g., wireless devices 204-1, 204-2, 204-3, and 204-4 also referred to herein collectively as "wireless devices 204") located within the geographic area 200 are in communication with the one or more cell sites 202. Each cell site has a network coverage area (e.g., a network coverage area 206-1 and a network coverage area 206-2 also referred to herein collectively as "network coverage areas 206"). As shown in FIG. 2, the cell site 202-1 has the network coverage area 206-1 and the cell site 202-2 has the network coverage area 206-2. The coverage areas 206-1 and 206-2 overlap each other. In one example, a network coverage area of a single cell site 202 can have a radius ranging from five to ten kilometers in a geographic area including a high population area. A network coverage area of a single cell site 202 can have a radius that is larger than ten kilometers in a geographic area including a low population area. A size of the geographic area 200 can be approximately the same, smaller, or larger than the combined network coverage area of cell sites 202.

In order to estimate a real-time distribution of the multiple wireless devices in the geographic area 200, the present technology can train an ML model to associate non-real-time data network activity collected from the wireless devices in the geographic area 200 to subregions of the geographic area 200. As shown in FIG. 2, the geographic area 200 is divided into multiple subregions (e.g., subregions 208-1, 208-2, and 208-3 also referred to herein collectively as "subregions 208"). For example, the wireless device 204-1 in the subregion 208-3 is located within the network coverage area 206-2 (and not within the network coverage area 206-1) and is in communication with the cell site 202-2, wireless device 204-4 in the subregion 208-2 is located within the network coverage area 206-1 (and not within the network coverage area 206-2) and is in communication with the cell site 202-1. The wireless devices 204-2 and 204-3 in the subregion 208-1 are located within both of the network coverage areas 206-1 and 206-2. They can therefore be in communication with either the cell sites 202-1 or 202-2 based on their location. In FIG. 2, the wireless device 204-2 is in communication with the cell site 202-2 and the wireless device 204-3 is in communication with the cell site 202-4.

The subregions 208 can be adjacent to each other so that the adjacent regions are in contact with each other without overlapping. The subregions can have a polygonal shape. For example, the subregions 208 can have a triangular, a rectangular, a hexagonal shape, or an octagonal shape. In some implementations, the subregions 208 are only partially adjacent to each other (e.g., octagonal subregions can be partially adjacent to each other). In some implementations, the subregions 208 have a hexagonal shape as shown in FIG. 2. The hexagonal shape can be particularly useful when, for example, estimating distances between two locations or routes for traveling from a first location to a second location because all the corners of a hexagon are at equal distances from each other. Such shape configuration provides a simpler calculation for a route estimation. Such distance estimation can be useful, for example, when estimating the population distribution density for a ground vehicle or air vehicle traffic purposes.

In one example, the subregions 208 can have a diameter or a dimension ranging from five meters to 100 meters (e.g., 5 meters, 10 meters, 25 meters, 50 meters, 75 meters, or 100 meters). For example, a hexagonal subregion can have a diameter between two opposing corners ranging from five to 100 meters or a rectangular subregion can have a diagonal ranging from five to 100 meters. A highly populated area (e.g., a city or a town) can be divided into smaller size subregions (e.g., subregions having a diameter ranging from five meters to 50 meters) in order to provide a more accurate and higher resolution estimation of the distribution density. In contrast, a larger size subregion (e.g., subregions having a diameter ranging from 50 meters to 100 meters) can be required for low population areas. For example, having a small subregion size in a city center will provide more accurate information about population distribution density and be more useful for traffic planning. In contrast, a smaller subregion size cannot be applicable in areas having expected low population.

The subregions 208 can have a uniform size (e.g., all subregions 208 have a same size) or varying size. In some implementations, the sizes of the subregions are predefined based on an expected population density across the geographic area 200 so that areas expected to have a high population density (e.g., a city center) have a smaller subregion size and areas expected to have a low population density (e.g., countryside) have a larger subregion size. The sizes of the subregions can be also predefined based on the geographical precision process specific to a use case. For example, a use case of air traffic planning can have a different precision requirement than a use case of ground vehicle traffic planning.

Figure 3:
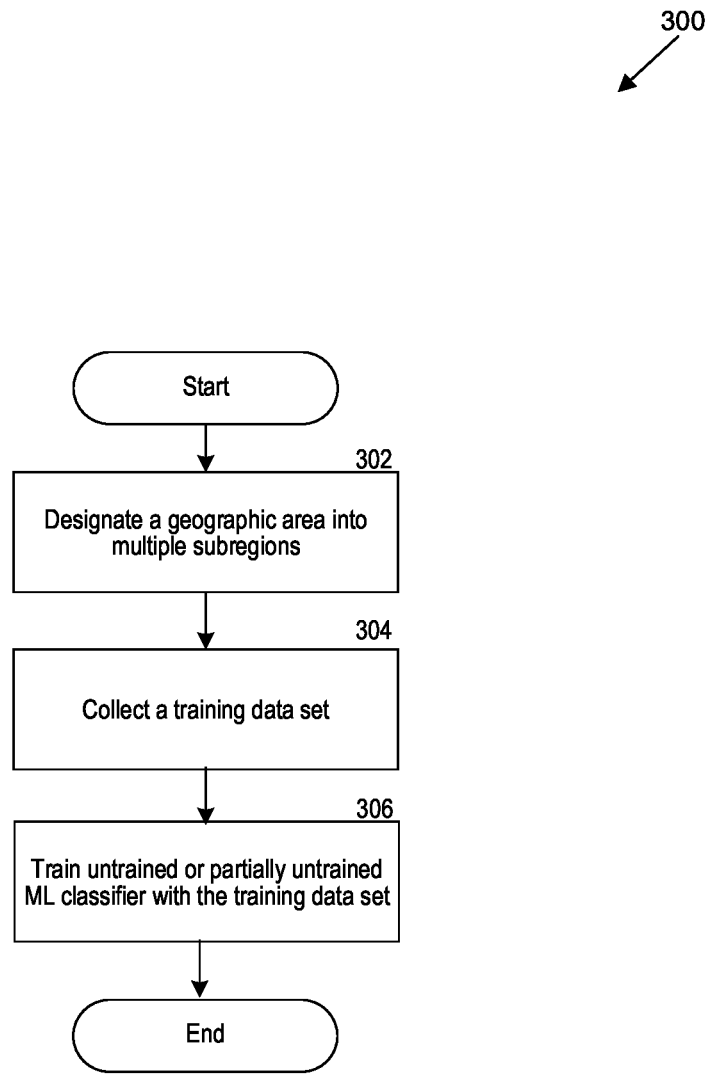
FIG. 3 is a flowchart that illustrates computer-implemented processes for training an ML classifier for the estimation of a real-time distribution density of wireless devices in a geographic area.
Figure 4:
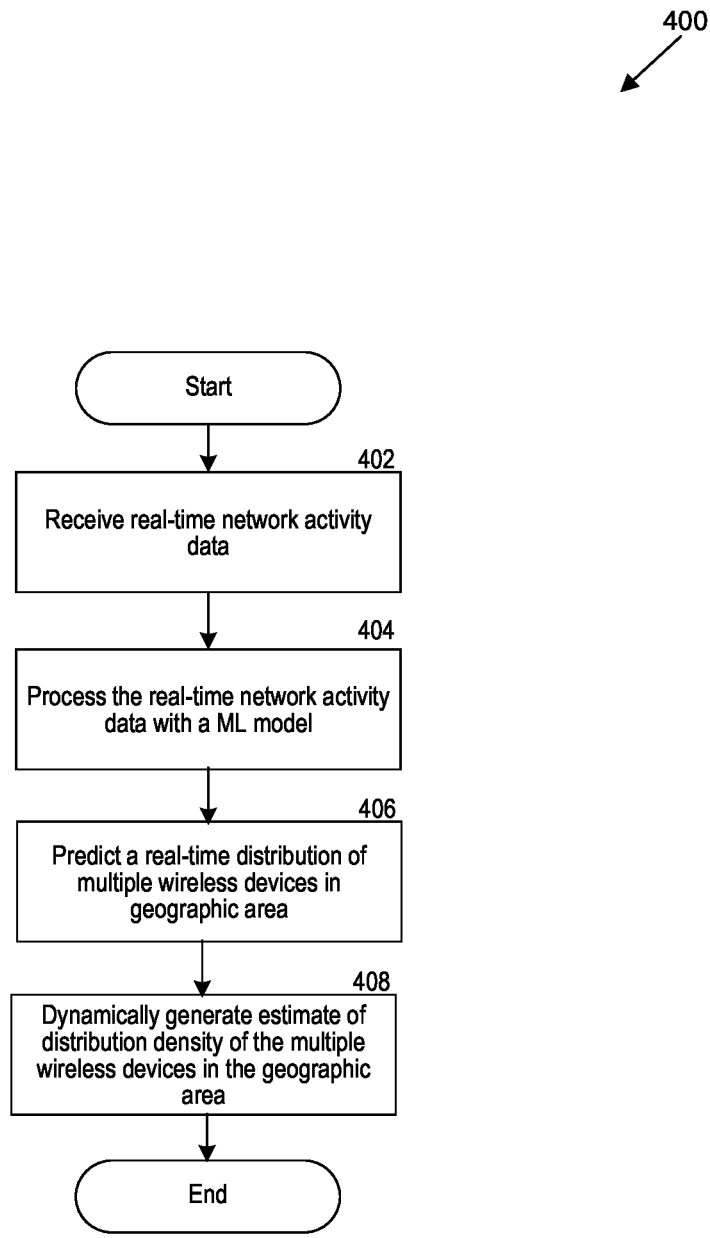
FIG. 4 is a flowchart that illustrates computer-implemented processes for dynamically generating an estimate of a real-time distribution density of wireless devices in a geographic area.

The geographic area 200 described with respect to FIG. 2 including the subregions 208 can be used as a basis for dynamically estimating a real-time distribution density of wireless devices, as described with respect to the processes of FIGS. 3 and 4.

FIG. 3 is a flowchart that illustrates computer-implemented processes 300 for training an ML classifier (or an ML model) for estimating of a distribution density of wireless devices in a geographic area. The processes 300 can be performed by a computer system. The computer system can be associated with a wireless service provider. The computer system can include at least one hardware processor and at least one non-transitory memory storing instructions. In one example, the computer system corresponds to a computer system 500 described with respect to FIG. 5. When the instructions are executed by at least one hardware processor, the server system performs the processes 300.

A "model," a "machine learning model," or a "machine learning classifier" as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the ML model can be a neural network with multiple input nodes that receive training data. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used to associate the time-stamped non-real-time network activity data with different subregions of the geographic area. In some implementations, such neural networks, known as deep neural networks, can have multiple layers of intermediate nodes with different configurations, and can be a combination of models that receive different parts of the input and/or input from other parts of the deep neural network, or are convolutions—partially using output from previous iterations of applying the model as further input to produce results for the current input.

An ML model can be trained with supervised learning, where the training data includes non-real-time time-stamped network activity data and locations of wireless devices in a particular geographic area as input and a desired output, such as an association of the time-stamped activity data of the wireless devices with a subregion of a geographic area. A representation of a distribution of the wireless devices across the subregions can be provided to the model. Output from the model can be compared to the actual locations of the wireless devices and, based on the comparison, the model can be modified, such as by changing weights between nodes of the neural network or parameters of the functions used at each node in the neural network (e.g., applying a loss function). After applying the training data and modifying the model in this manner, the model can be trained to dynamically estimate the real-time distribution density of wireless devices across the subregions of the geographic area.

At 302, the computer system divides a geographic area into multiple subregions (e.g., the geographic area 200 in FIG. 2 is designates multiple subregions 208). The geographic area is included, or at least partially included, in a network coverage area of multiple cell sites (e.g., the cell sites 202). The multiple subregions can be distinct from, and adjacent to, each other. For example, as shown in FIG. 2, the different subregions 208 are adjacent to each other without overlapping. In some implementations, the different subregions 208 are only partially adjacent to each other (e.g., octagonal subregions).

As described with respect to subregions 208 in FIG. 2, the multiple subregions can have a polygonal shape. For example, the multiple subregions can have a polygonal shape that includes four or more corners (e.g., the subregions have rectangular or hexagonal shapes). In one example, a diameter or a dimension of a respective subregion of the multiple subregions can range from five meters to 100 meters. The diameter or the dimension of the subregions can be predefined based on an expected population density across the area. A highly populated area can be divided into smaller size subregions in order to provide a more accurate and higher resolution estimation of the distribution density. In contrast, larger size subregions can be set for low population areas. The diameter of the dimension of the subregions can also be predefined based on the geographical precision of a specific use case. In some implementations, the ML classifier can be trained to apply simultaneously to multiple subregion configurations.

At 304, the computer system collects a training data set. The training data set includes non-real-time network activity data indicating counts of voice, data, or messaging activities by wireless devices previously served at different points in time by the multiple cell sites in the geographic area. Network activity count, also referred to herein as network traffic, refers to the amount of data moving across a computer network at any given time. The data moving across the computer network can include, for example, voice, text, video, messaging, and other data. The network activity count across the computer network can also include signaling exchange between a wireless device and the network for purpose of managing the access, authentication, mobility, and setup of the voice, data, or messaging activities. The movement of data can arise from users' activities on their wireless devices that including, for example, calls, messaging, and internet communications.

A training data set for estimating the distribution density of wireless devices in the geographic area 200 can include network activity of wireless devices 204 that are served by cell sites 202 in FIG. 2. The non-real-time activity data is time-stamped (e.g., the network activities are associated with a time and date). For example, the network activity data that includes the voice, data, or messaging activities by a particular wireless device includes time information so that a particular network activity can be associated with a certain day of the week and a certain time of the day. In some implementations, the training data set can include non-real-time network activity data collected at different time intervals. For example, a time interval can range from five minutes to 60 minutes (e.g., the time interval is 5 minutes, 15 m minutes, 30 minutes, or 60 minutes).

The non-real-time network activity can also include location data of the wireless devices at the different points in time or at the different time intervals. The location data can be based on Global Positioning System (GPS) tracking, accelerometers, Wi-Fi connections, Bluetooth connections, and/or other sensors of the wireless devices. In one example, the wireless devices are equipped with GPS trackers that continuously or periodically determine the locations of the respective wireless devices. The non-real-time network activity can thereby include a combination of time, location and network activity count for a respective wireless device. The wireless devices can collect the non-real-time network activity information and send it to a collection server periodically (e.g., every 12 hours or every 24 hours). The collection server can convert the location data to geographical area identifiers, such as geohash identifiers. Geohash refers to a public domain geocode system that encodes a geographic location into a string of letters and digits.

In some implementations, the training data set includes diagnostic metric data collected from multiple wireless devices that are located in the geographic area. The diagnostic metric data can be collected by an instance of a mobile application operating on the respective wireless devices and then transmitted (e.g., periodically every 24 hours) to a server system associated with the wireless network. In one example, the diagnostic metrics data is collected by the wireless network providers for ensuring good network quality and device performance. The diagnostic metrics data can, for example, be used for recognizing weak network signals or ensuring a smooth performance of the wireless devices. The data is then further transmitted to the computer system that can process and store the data as a training data set for the ML model.

In some implementations, collecting the training data set includes collecting the non-real-time network activity data periodically for a preset time interval during a particular time period. The preset time interval can be, for example, 12 hours, 24 hours, or 48 hours. The particular time period can be a week or a month or six months. For example, the training data set includes data collected every 24 hours for a month.

The non-real-time activity data thereby indicates a magnitude of network activity (e.g., voice, data, or messaging activities) that a user of a wireless device (e.g., the wireless devices 204 in FIG. 2) is using at different times of a day at different days of a week. The non-real-time activity data can also indicate a location of the wireless device at the different times of the day on the different days of the week. The non-real-time activity data can also identify the particular cell site (e.g., a particular cell site of the cell sites 202 in FIG.

2) that has been in communication with the wireless device during the different times of the day on the different days of the week.

In some implementations, the training data set includes the non-real-time network activity data obtained only from a portion of wireless devices that are located within the geographic area during the time period of collecting the training data set. The collection of training data can be an opt in process. For example, the users of the wireless devices can choose to allow or not to allow the mobile application operating on the respective wireless device to collect diagnostic metrics data. Also, in some implementations, the instances of the mobile application can have operational issues or the mobile application might not be supported by all wireless devices. The training data set can include the non-real-time network activity data from at least 65%, at least 75%, at least 85%, or at least 95% of wireless devices that are located within the geographic area during the time period of collecting the training data set.

At 306, the computer system trains an untrained or trained ML classifier with the training data set. The ML classifier is trained to associate the non-real-time network activity of the wireless devices at the different points in time or at the different time intervals with respective subregions of the geographic area based on the location data of the wireless devices thereby obtaining a trained ML classifier. The trained ML classifier is for estimating a real-time distribution of the multiple wireless devices across the subregions of the geographic area.

For example, FIG. 2 illustrates the locations of the wireless devices 204 at a particular point in time based on the non-real-time network activity data. Accordingly, the wireless device 204-1 has a first location and is in communication with the cell site 202-2 at a particular point in time. Similarly, the wireless device 204-2 has a second location and is in communication with the cell site 202-2, the wireless device 204-3 has a third location and is in communication with the cell site 202-1, and the wireless device 204-4 has a fourth location and is in communication with the cell site 202-1. The non-real-time network activity data also includes the network activity counts for the wireless devices 204-1 through 204-4 at the particular point in time (e.g., how much voice, data, and messaging activities are each of the devices using). Based on the non-real-time network activity data, the computer system can train the untrained or trained ML classifier to associate a portion of the network activity associated with each of the cell sites to wireless devices located at respective subregions 208 of the geographical area 200.

In some implementations, the ML model computes a probability (P) for each subregion of the geographical area by Formula 1 where P is a probability for network activity at a time point t by a cell site y to be associated with a subregion x.

$$P(\text{subregion}_x, \text{cell site}_y, \text{time}_t) = \frac{\text{report (cell site}_y, \text{time}_t, \text{subregion}_x)}{\sum_{\text{area}_n} \text{report (cell site}_y, \text{time}_t, \text{subregion}_n)}, \quad \text{Formula 1}$$

where the numerator includes 'report' referring to the non-real-time network activity data collected from a particular cell site (cell site$_y$) at a particular time (time$_t$) (e.g., a particular time of a day during a particular day of a week) from a wireless device located at a particular subregion (subregion$_x$) and the denominator is a sum over all subregions (subregion$_n$) served by the particular cell site (cell site$_y$) at the particular time (time$_t$).

FIG. 4 is a flow chart that illustrates computer-implemented processes 400 for dynamically generating an estimate of a real-time distribution density of wireless devices in a geographic area. The processes 400 can be performed by a computer system. The computer system can be associated with a wireless service provider. The computer system can include at least one hardware processor and at least one non-transitory memory storing instructions. In one example, the computer system corresponds to a computer system 500 described with respect to FIG. 5. When the instructions are executed by the at least one hardware processor, the server system performs the processes 300.

At 402, the computer system receives real-time time network activity data collected at multiple cell sites in a geographic area (e.g., the cell sites 202-1 and 202-2 in the geographic area 200 in FIG. 2). As used herein, real-time network activity data includes data that is collected during the last preset time period. The time period can correspond to, for example, the last 5 minutes, last 10 minutes, last 15 minutes, last 30 minutes, or last 60 minutes. The real-time network activity data indicates a real-time count of network activities by multiple wireless devices currently being served by the multiple cell sites in the geographic region. The network activity data can include voice, data, or messaging network activities. For example, the real-time network activity data includes an identification of a cell site (e.g., the cell sites 202-1 and 202-2) that provides a certain count of network activity within its network coverage area (e.g., the respective network coverage areas 206-1 and 206-2).

In some implementations, the real-time network activity data is collected at the multiple cell sites in the geographic area for a time interval that is less than or equal to a preset time period. In some examples, the preset time period can be less than or equal to 60 minutes, less than or equal to 30 minutes, less than or equal to 15 minutes, less than or equal to 10 minutes, or less than or equal to 5 minutes. In one example, the computer system receives network activity data that has been collected from the multiple cell sites in the past 15 minutes. In some implementations, the network activity data is transmitted from the multiple cell sites to a server system associated with the wireless network provider. The server system can then either process the data itself (e.g., perform the processes 400) or transmit the real-time network activity data to a different computer system for processing.

At 404, the computer system processes the real-time network activity data with a ML model that is trained based on non-real-time network activity data to predict distributions of wireless devices in the geographic area. The ML model is configured to predict a real-time distribution of wireless devices in the geographic area at different points in time. For example, the computer system processes the real-time network activity data with the ML model that is trained in accordance with the processes 300 described with respect to FIG. 3.

The non-real-time network activity data can indicate counts of voice, data, or messaging activities by a portion of wireless devices previously served at different points in time by the multiple cell sites in the geographic region. The collection of the non-real-time network activity data can be an opt in process. For example, the users of the wireless devices can opt in or opt out from allowing a mobile application operating on their wireless devices to collect diagnostic metrics data. Therefore, the non-real-time network activity data is collected from less than all of the wireless devices in the geographic area. For example, the portion of the wireless devices includes at least 65%, at least 75%, at least 85%, or at least 95% of the wireless devices previously served at the different time points. The non-real-time network activity data also includes location data (e.g., geohash identifiers) of the portion of wireless devices (e.g., location data received based on GPS trackers, accelerometers, Wi-Fi connections, Bluetooth connections, and/or other sensors of the respective wireless devices).

In some implementations, the non-real-time network activity data is collected periodically from the portion of wireless devices via mobile application instances operating on the portion of wireless devices (e.g., as described with respect to 304 in FIG. 3). For example, the non-real-time network activity data is collected as diagnostic metrics data via mobile applications operating on the portion of wireless devices.

At 406, the computer system predicts a real-time distribution of the multiple wireless devices in the geographic area based on the ML model. In one example, the real-time distribution is predicted based on a pattern of network activities and locations of wireless devices at prior points in time that are analogous to a current point in time. As such, a real-time distribution of network activities at a particular subregion during a particular time of day during a particular day of a week can be predicted based on a pattern of network activities and locations of the wireless devices that have occurred in the past on the same day of the week at the same time. In some implementations, the prior points in time that are analogous to the current point in time are time intervals ranging from 5 minutes to 60 minutes (e.g., 5 minutes, 10 minutes, 15 minutes, 30 minutes, or 60 minutes).

In some implementations, the real-time distribution of the wireless devices for a particular time point during a particular day of a week is predicted based on a pattern of network activities and locations of wireless devices at a prior time point that matches the particular time point during the particular day of the week. For example, network activities for a particular subregion (e.g., the subregion 208-1, 208-2, or 208-3 in FIG. 2) on Saturday mornings between 9 AM and 10 AM can be predicted based on a pattern of network activities and locations of wireless devices on previous Saturday mornings at the same time (9 AM-10 AM) associated with the particular subregion.

In some implementations, the computer system estimates a non-real-time network activity data of all wireless devices previously served at the different points in time by the multiple cell sites in the geographic area based on the non-real-time network activity data of the portion of wireless devices. For example, the portion of the wireless devices previously served at the different points in time can correspond to at least 65%, at least 75%, at least 85%, or at least 95% of wireless devices that are located within the geographic area during the different points in time. The computer system can extrapolate the non-real-time network activity data of the portion of the wireless devices previously served at the different points in time to correspond to the non-real-time network activity data of all the wireless devices served at the different points in time.

At 408, the computer system dynamically generates an estimate of a distribution density of the multiple wireless devices in the geographic area based on the predicted real-time distribution and adjusted by the real-time count of network activities. For example, the probability P for network activity at a time point t by a cell site y to be associated with subregion x computed in accordance with Formula 1 can be adjusted with the real-time network activity data received from the cell site y to receive an adjusted probability for the real-time network activity at a real-time time point t ($P_{adjusted}$) accordance with Formula 2.

$$P_{adjusted} = P(\text{subregion}_x, \text{cell site}_y, \text{time}_t) * \text{activity}_{real\text{-}time\ t}(\text{cell site}_y, \text{time}_{real\text{-}time}t),$$ Formula 2:

where $\text{activity}_{real\text{-}time\ t}$ corresponds to the real-time network activity data received from the cell site y during a real-time point in time t. The real-time point in time t is analogous to the non-real-time point in time t (e.g., t corresponds to a particular point in time or a time interval during the same time of a day during the same day of a week).

In some implementations, the computer system divides the geographical area into multiple distinct and adjacent subregions (e.g., subregions 208 of the geographic area 200 described with respect to FIG. 2). Each of the multiple subregions can have a polygonal shape that includes four or more corners (e.g., a rectangular or hexagonal shape). Predicting the real-time distribution of the multiple wireless devices in the geographic area can include predicting the number of wireless devices located within the respective multiple subregions in real-time. In some implementations, the estimate of the distribution density of the multiple wireless devices in the geographic area includes estimates for amounts of wireless devices for the multiple adjacent subregions of the geographic area. In some implementations, the computer system can apply the ML classifier simultaneously to multiple subregion configurations (e.g., configurations including different shapes and sizes of the subregions).

As described with respect to FIG. 2, a diameter or a dimension of a respective subregion of the multiple adjacent subregions can range from five meters to 100 meters. The multiple subregions can have a uniform size or different sizes. A size of a respective subregion of the multiple subregions can be predefined based on an expected population density of the respective subregion. For example, a highly-populated area (e.g., a city or a town) can be divided into smaller size subregions (e.g., subregions having a diameter ranging from five meters to 50 meters) in order to provide a more accurate and higher resolution estimation of the distribution density. In contrast, a larger size subregion (e.g., subregions having a diameter ranging from 50 meters to 100 meters) can be required for low population areas.

In some implementations, the computer system evaluates the ML model by comparing the dynamically generated estimate of the distribution density of the multiple wireless devices in the geographic area to an actual distribution density of the multiple wireless devices which is determined based on data collected from the multiple wireless devices afterward as a non-real-time data. For example, the computer system can estimate the distribution density based on wireless devices in a geographic area using the processes 400 for a particular time interval on a particular day. The computer system then receives diagnostic metrics data from wireless devices that have been located in the geographic area during the particular time interval on that particular day and compares a distribution density of wireless devices computed based on the diagnostic metrics data to the estimated distribution density. Based on the comparison, the ML model can be adjusted. The evaluation can be iterated multiple times to improve the accuracy of the ML model.

As described, the present technology provides for a dynamic estimation of the distribution density of wireless devices using real-time or near-real-time data. The distribution density of wireless devices can be used as an indication of the population distribution density due to the popularity of wireless devices. The dynamic estimation can be used for the prevention and solving of population density-related issues in real-time or in near-real-time. As an example, the dynamic estimation of population distribution density can be used for the prevention and solving of traffic-related problems. The traffic-related problems can involve air vehicles or ground vehicles. For example, a road gridlock can be prevented or solved by directing traffic to alternate routes based on the real-time estimation of population distribution density. As another example, the real-time estimation of population distribution density can be applied for planning ground vehicle or air vehicle routes. For example, a drone route can be planned based on the real-time estimation of population distribution density so that the drone route can avoid high population density areas and be directed toward lower population density areas in real-time. As a further example, the dynamic estimation of a population distribution density can be used to assist in rescue efforts during manmade or natural disasters. For example, in an instance of a wildfire, the dynamic estimation of population distribution density can be used for the estimation of the distribution density of people in danger.

Computer System

Figure 5:
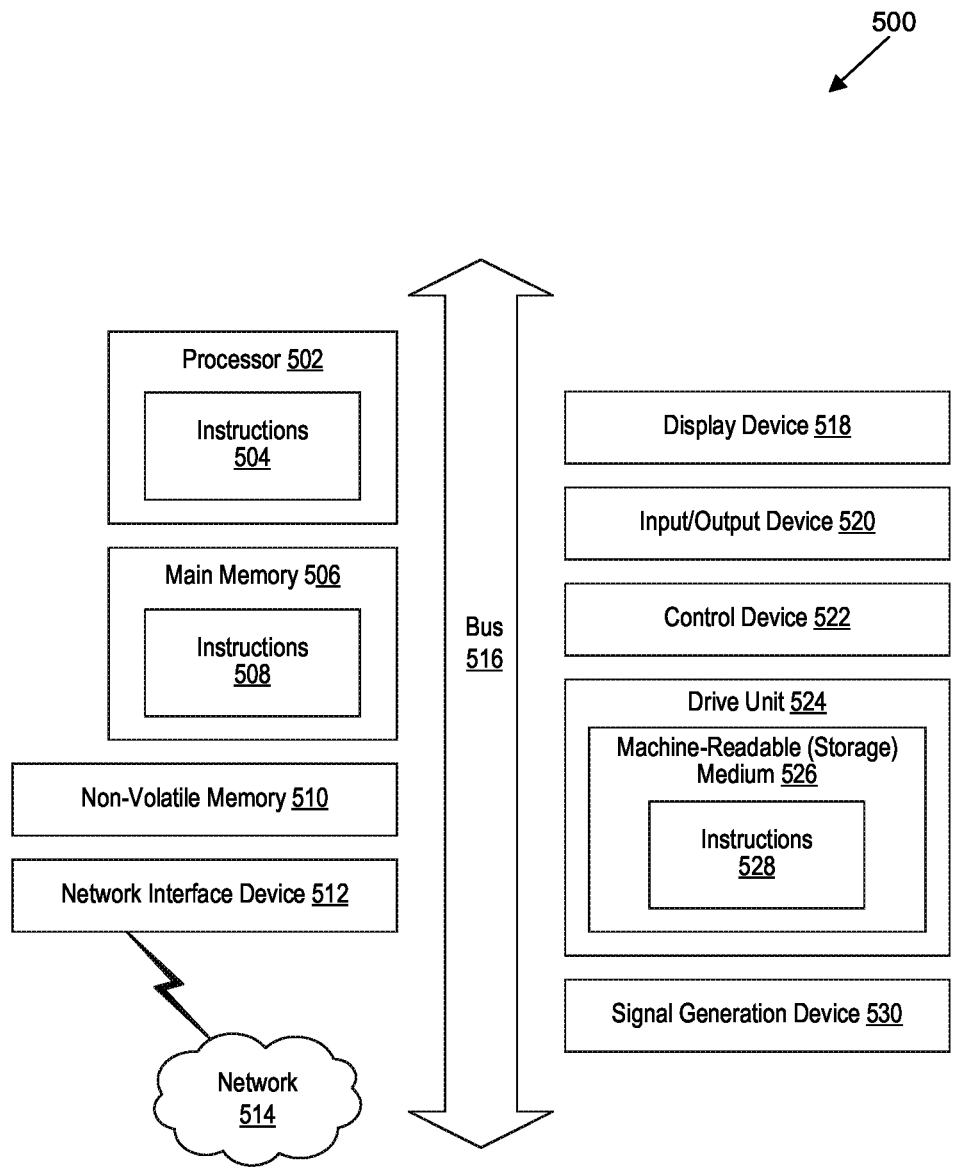
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer-implemented method for dynamically generating an estimate of a real-time distribution density of wireless devices in a geographic area, the method comprising:
   receiving real-time network activity data collected at multiple cell sites in a geographic area,
      wherein the real-time network activity data indicates a real-time count of network activities including voice, data, or messaging activities by multiple wireless devices currently being served by the multiple cell sites in the geographic area,
      wherein each of the multiple cell sites has a coverage area having a radius of at least 5 kilometers, and
      wherein a size of the geographic area is approximately same as a combined network coverage area of the multiple cell sites; and
   processing the real-time network activity data with a machine learning (ML) model that is trained based on non-real-time network activity data to predict distributions of wireless devices in the geographic area,
      wherein the non-real-time network activity data indicate counts of voice, data, or messaging by a portion of wireless devices previously served at different points in time by the multiple cell sites in the geographic area and includes location data of the portion of wireless devices,
      wherein the location data is based on one or more location sensors of each wireless device of the portion of wireless devices, and
      wherein the ML model is configured to predict a real-time distribution of wireless devices in the geographic area at different points in time;
   predicting, based on the ML model, a real-time distribution of the multiple wireless devices in the geographic area,
      wherein the real-time distribution is predicted based on a pattern of network activities and locations of wireless devices at prior points in time that are analogous to a current point in time; and
   dynamically generating an estimate of a distribution density of the multiple wireless devices in the geographic area for a particular point in time based on the predicted real-time distribution, adjusted by the real-time count of network activities;
   subsequent to generating the estimate, generating an actual distribution density of wireless devices for the particular point in time using diagnostic metrics received from wireless devices located in the geographic area during the particular point in time; and
   adjusting the ML model based on a comparison between the estimate of the distribution density and the actual distribution density.

2. The method of claim 1, wherein the real-time network activity data is collected at the multiple cell sites in the geographic area for a time interval that is less than or equal to a preset time period.

3. The method of claim 1, wherein the method further comprises:
designating the geographical area into multiple distinct and adjacent subregions,
each of the multiple subregions have a polygonal shape that includes four or more corners, and
predicting the real-time distribution of the multiple wireless devices in the geographic area includes predicting a number of wireless devices located within the respective multiple subregions in real-time.

4. The method of claim 1, wherein the non-real-time network activity data is collected periodically from the portion of wireless devices via mobile application instances operating on the portion of wireless devices.

5. The method of claim 1, wherein the real-time distribution of the wireless devices for a particular time point during a particular day of a week is predicted based on a pattern of network activities and locations of wireless devices at a prior time point that matches the particular time point during the particular day of the week.

6. The method of claim 1, wherein the prior points in time that are analogous to the current point in time are time intervals ranging from 5 minutes to 60 minutes.

7. The method of claim 1, wherein:
the estimate of the distribution density of the multiple wireless devices in the geographic area includes estimates for amounts of wireless devices for multiple adjacent subregions of the geographic area, and
a diameter of a respective subregion of the multiple adjacent subregions ranges from five meters to 100 meters.

8. The method of claim 1, wherein:
the estimate of the distribution density of the multiple wireless devices in the geographic area includes estimates for amounts of wireless devices for multiple distinct and adjacent subregions of the geographic area,
the multiple subregions have different sizes, and
a size of a respective subregion of the multiple subregions is predefined based on an expected population density of the respective subregion.

9. The method of claim 1, further comprising:
estimating a non-real-time network activity data of all wireless devices previously served at the different points in time by the multiple cell sites in the geographic area based on the non-real-time network activity data of the portion of wireless devices.

10. The method of claim 1,
wherein the non-real-time network activity data comprises historical diagnostics data collected by mobile application instances operating on the portion of wireless devices, and
wherein users of the portion of wireless devices have authorized the collection of the diagnostics data.

11. A computer system for dynamically generating an estimate of a real-time distribution density of wireless devices in a geographic area, the system comprising:
at least one hardware processor, and
at least one non-transitory memory storing instructions, which, when executed by the at least one hardware processor, cause the system to:
receive real-time network activity data collected at multiple cell sites in a geographic area,
wherein each of the multiple cell sites has a coverage area having a radius of at least 5 kilometers, and
wherein a size of the geographic area is approximately same as a combined network coverage area of the multiple cell sites;
process the real-time network activity data with a machine learning (ML) model that is trained based on non-real-time network activity data to predict distributions of wireless devices on the geographic area,
wherein the non-real-time network activity data indicates counts of network activities by wireless devices previously served at different time intervals by the multiple cell sites in the geographic area and includes location data of the wireless devices,
wherein the location data is based on one or more location sensors of each of the wireless devices, and
wherein the ML model is configured to predict a real-time distribution of wireless devices on the geographic area at different time intervals;
predict, based on the ML model, a real-time distribution of the multiple wireless devices in the geographic area,
wherein the real-time distribution is predicted based on a pattern of network activities and locations of wireless devices at prior time intervals that are analogous to a current time interval;
dynamically generating an estimate of a distribution density of the multiple wireless devices on the geographic area for a particular point in time based on the predicted real-time distribution, adjusted by the real-time count of network activities;
subsequent to generating the estimate, generating an actual distribution density of wireless devices for the particular point in time using diagnostic metrics received from wireless devices located in the geographic area during the particular point in time; and
adjusting the ML model based on a comparison between the estimate of the distribution density and the actual distribution density.

12. The system of claim 11, wherein the network activity data include voice, data, or messaging activities.

13. The system of claim 11, wherein the prior time intervals that are analogous to the current time interval range from 5 minutes to 60 minutes.

14. The system of claim 11, wherein the real-time distribution of the wireless devices for a particular time point during a particular day of a week is predicted based on a pattern of network activities and locations of wireless devices at a prior time point that matches the particular time point during the particular day of the week.

15. The system of claim 11, wherein:
the estimate of the distribution density of the multiple wireless devices in the geographic area includes estimates for amounts of wireless devices for multiple adjacent subregions of the geographic area, and
a diameter of a respective subregion of the multiple adjacent subregions ranges from five meters to 100 meters.

16. The system of claim 11, wherein:
the estimate of the distribution density of the multiple wireless devices in the geographic area includes estimates for amounts of wireless devices for multiple distinct and adjacent subregions of the geographic area,
the multiple subregions have different sizes, and
a size of a respective subregion of the multiple subregions is predefined based on an expected population density of the respective subregion.

17. A computer-implemented method for training a machine learning (ML) classifier for estimation of a real-time distribution density of wireless devices in a geographic area, the method comprising:
- designating a geographic area into multiple subregions,
    - wherein the geographic area is included in a network coverage area of multiple cell sites,
    - wherein each of the multiple cell sites has a coverage area having a radius of at least 5 kilometers, and
    - wherein a size of the geographic area is approximately same as a combined network coverage area of the multiple cell sites;
- collecting a training data set including non-real-time network activity data indicating counts of voice, data, or messaging activities by wireless devices previously served at different points in time by the multiple cell sites in the geographic area and includes location data of the wireless devices,
    - wherein the location data is based on one or more location sensors of each of the wireless devices;
- training an untrained ML classifier with the training data set to associate the non-real-time network activity of the wireless devices at the different points in time with respective subregions of the geographic area based on the location data of the wireless devices thereby obtaining a trained ML classifier that estimates a real-time distribution of the multiple wireless devices across the subregions of the geographic area;
- generating an estimate of a distribution density of the multiple wireless devices of the geographic area for a particular point in time using the trained ML;
- subsequent to generating the estimate, generating an actual distribution density of wireless devices for the particular point in time using diagnostic metrics received from wireless devices located in the geographic area during the particular point in time; and
- adjusting the trained ML model based on a comparison between the estimate of the distribution density and the actual distribution density.

18. The method of claim 17, wherein the multiple subregions are distinct from and adjacent to each other and the multiple subregions have a polygonal shape that includes four or more corners.

19. The method of claim 17, wherein:
the multiple subregions have different sizes, and
a size of a respective subregion of the multiple subregions is predefined based on an expected population density of the respective subregion.

20. The method of claim 17, wherein a diameter of a respective subregion of the multiple subregions ranges from five meters to 100 meters.

21. The method of claim 17, wherein collecting the training data set includes collecting the non-real-time network activity data periodically for a preset time interval during a particular time period.

* * * * *